Feb. 19, 1946.  P. S. BUTCHKO  2,395,249
ADJUSTMENT FINGER FOR TOOL GRINDERS
Filed May 11, 1944
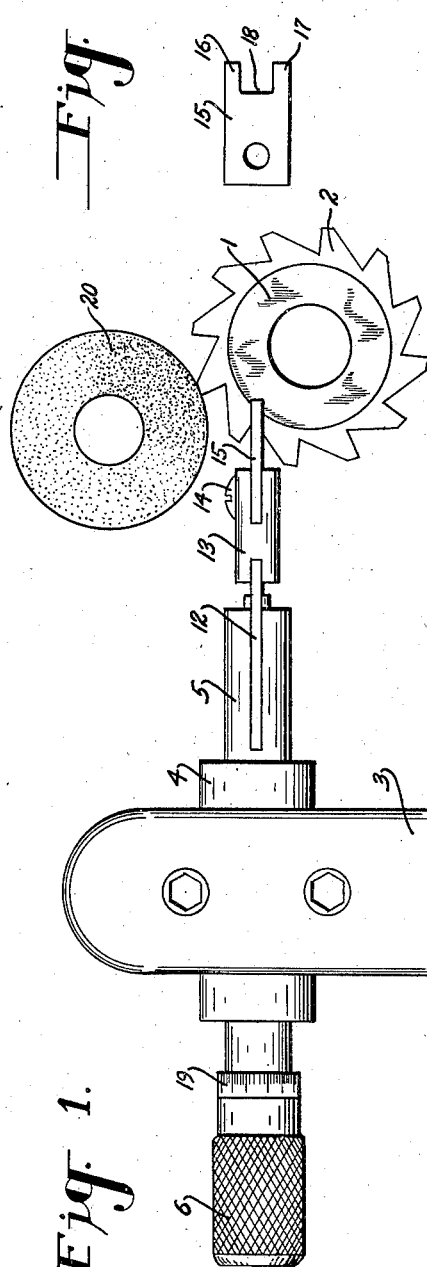
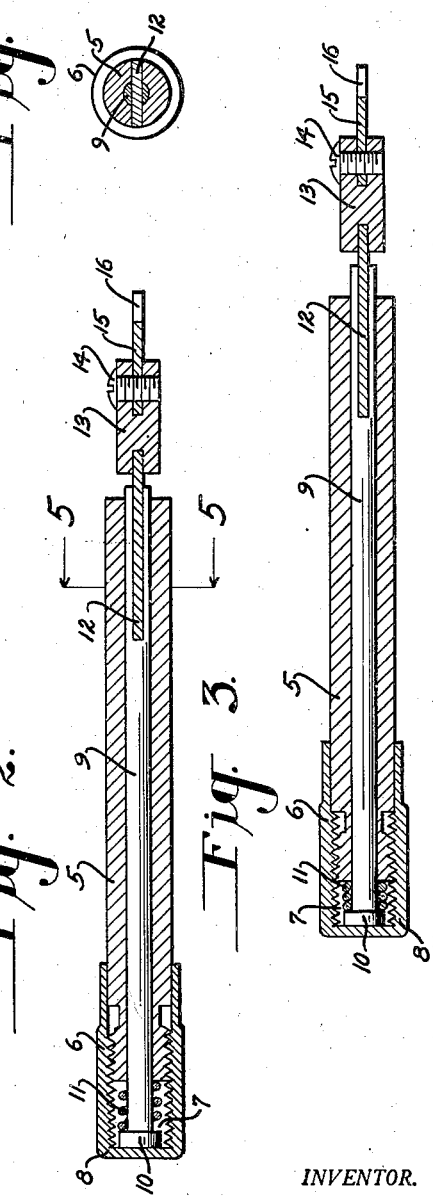
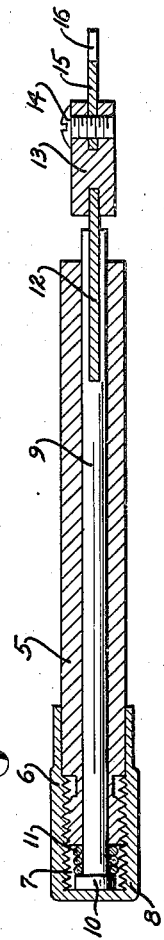
INVENTOR.
PAUL S. BUTCHKO
BY
*Frank H. Harmon*
ATTORNEY Patented Feb. 19, 1946

2,395,249

UNITED STATES PATENT OFFICE 2,395,249

ADJUSTMENT FINGER FOR TOOL GRINDERS

Paul S. Butchko, Lorain, Ohio, assignor, by mesne assignments, to Jack & Heintz, Inc., Cleveland, Ohio, a corporation of Ohio Application May 11, 1944, Serial No. 535,063

1 Claim. (Cl. 51—238)

This invention relates to improvements in gauges and has for one of its primary objects to provide a simple adjustable gauge including an adjustable and replaceable flexible finger for holding a circular tool cutter from any angle and checking the overall concentricity thereof while being ground and insuring the grinding of each tooth of the cutter at the same angle.

With the foregoing and other objects in view, the invention resides in the combination of parts and in the details of construction hereinafter set forth in the following specification and appended claim, certain embodiments thereof being illustrated in the accompanying drawing, in which:

Figure 1 is a view in side elevation of the gauge in its holder engaging a toothed tool cutter and a grinding wheel engaging the latter;

Figure 2 is a view in longitudinal section taken through the gauge adjusted to have its finger in relatively retracted position;

Figure 3 is a similar view, showing the finger to be in extended position;

Figure 4 is a top plan view of the forked replaceable finger; and

Figure 5 is a view in section taken along line 5—5 of Figure 1.

Referring more particularly to the drawing, the circular tool cutter 1 is provided with peripheral teeth 2. The purpose of the invention is to provide a device for holding the cutter from any desired angle and insuring the overall concentricity of the cutter by making sure that the grinder grinds each tooth at the same angle as the cutter is being held while the holder is provided with a micrometer scale for checking purposes.

For this purpose there is provided a stationary standard 3 with a clamping barrel 4 to receive the cylinder 5 of the gauge. This cylinder is screw threaded at one end to receive a knurled knob 6, leaving a space 7 between the end of the cylinder and the closed end wall 8 of the knob. Slidably fitted in the bore of the cylinder is a rod 9 provided at one end with an enlarged head 10 to engage one end of a compression spring 11 which latter also bears against the adjacent end of the cylinder. The spring thus tends to maintain the rod in the retracted position shown in Figure 2 but such adjustment, or position, is governed by the adjusted position of knob 6 and its screw threaded engagement with the cylinder, as the spring takes up any slack or lost motion.

The rod and cylinder are slotted to fixedly receive a thin flat flexible metal strip 12 so that the latter is moved bodily with the rod. This strip has fixedly connected thereto a block 13. Removably and replaceably connected to the block by means of a screw bolt 14 is a flexible metallic blade 15 provided with forks 16 and 17 and a recess 18 therebetween.

With the blade 15 in position adjacent the tool cutter 1, the knob 6 is rotated until the recess 18 between forks 16 and 17 of the replaceable cutter blade 15 is brought into the position shown in Figure 4 to engage the cutter behind one of the teeth 2 and hold the same as a micrometer reading is taken off of the scale 19 as the grinding wheel 20 is brought into engagement with the teeth of the cutter. After the tooth has been ground the cutter is moved about its axis in a clockwise direction and the holding, measuring and grinding operation repeated throughout all of the teeth. The engagement of the fork below the tooth enables the holder to be applied to the cutter from any desired angle. Moreover, it insures holding against any possibility of becoming misaligned and also insures the same angle of grinding on each tooth by the grinding wheel.

The flexibility of suspension of block 13 by means of the strip 12 and the flexibility of metal blade 15 make for ease and convenience in engaging the cutter, as shown in Figure 4, for holding and measuring purposes as the cutter is moved clockwise. The adjustability of rod 9 and the replaceability of blade 15 make for a wide range of utility and application of the holding and concentricity measuring device.

From the foregoing it will be seen that there has been provided an apparatus capable of adjustment to accurately hold a tool at the proper relative attitude to the grinding member and wherein the adjustments are determined by scale, thus making it possible to duplicate the operation in subsequent accurate grinding operations.

I claim:

In a device for holding a tool cutter in engagement with a grinder and insuring and checking the uniform angle of cut of the teeth of the cutter, said device including a cylinder and a standard for supporting the same, a rod slidably carried in said cylinder and a rotatable knob adjustably secured to said cylinder for linearly moving said rod and a gauge carried by said knob for measuring the relative adjusted positions of said rod in said cylinder, a flexible strip secured to said rod and extending therethrough and transversely through said cylinder to be longitudinally slidable therein and maintained therein against rotation, a block secured to the outer end of said strip and means on said block to removably and replaceably receive a flexible blade with a forked end so that the latter may be adjusted linearly to bring the forked end into engagement with the various points on the periphery of said cutter to hold the same in a predetermined angular position with respect to the grinder.

PAUL S. BUTCHKO.